United States Patent [19]
Hakimi

[11] Patent Number: 5,898,842
[45] Date of Patent: *Apr. 27, 1999

[54] NETWORK CONTROLLER ADAPTER THAT PREVENTS LOSS OF DATA RECEIVED OR TRANSMITTED

[75] Inventor: Bijan Hakimi, Phoenix, Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/742,056

[22] Filed: Oct. 31, 1996

[51] Int. Cl.$^6$ .................................................. G06F 13/00
[52] U.S. Cl. ................................ 395/200.8; 395/200.54; 395/200.55; 395/200.78; 395/200.79; 395/182.02
[58] Field of Search ........... 395/200.51, 200.53–200.56, 395/200.59, 182.02, 200.78–200.8

[56] References Cited

U.S. PATENT DOCUMENTS

| | | | |
|---|---|---|---|
| 5,189,693 | 2/1993 | Nakajima | 379/100.17 |
| 5,390,233 | 2/1995 | Jensen et al. | 455/417 |
| 5,493,650 | 2/1996 | Reinke et al. | 395/200.55 |
| 5,664,105 | 9/1997 | Kisling et al. | 395/200.54 |
| 5,809,395 | 9/1998 | Hamilton-Piercy et al. | 455/4.1 |
| 5,818,832 | 10/1998 | McCallister | 370/350 |

*Primary Examiner*—Parshotam S. Lall
*Assistant Examiner*—Bharat Barot
*Attorney, Agent, or Firm*—Blakely, Sokoloff, Taylor & Zafman LLP

[57] ABSTRACT

A first embodiment of a circuit configured to be coupled to a network controller and a network is disclosed. The first embodiment includes a first circuit configured to receive bits of data from the network at a first frequency. The first embodiment also includes a second circuit, coupled to the first circuit. The second circuit is configured to generate, to the network controller, a first signal synchronous with a second frequency when the first circuit receives a predetermined number of bits. In response to the first signal, the network controller is configured to latch, at a second frequency, the predetermined number of bits. A second embodiment of a circuit configured to be coupled to a network controller and to a network is provided. The second embodiment includes a first circuit configured to transmit bits of data (bits) to the network at a first frequency. The second embodiment includes a second circuit, coupled to the first circuit. The second circuit is configured to generate a first signal, synchronous with a second frequency, to the network controller when the first circuit transmitted to the network a predetermined number of bits. In response to the first signal, the network controller is configured to generate to the first circuit, at a second frequency, a number of bits equal to the predetermined number.

16 Claims, 7 Drawing Sheets

NETWORK CONTROLLER ADAPTER THAT PREVENTS LOSS OF DATA RECEIVED OR TRANSMITTED

BACKGROUND OF THE INVENTION (1) Field of the Invention

The present invention relates to electronic circuits. More specifically, the present invention relates to a circuit interfacing between a computer system and a network.

(2) Description of the Related Art

Typically, network controllers are used to carry out conversion and transfer between ordinary payload data (residing in a system memory of a computer system) and frames transmitted to or received from a network upstream or downstream. One such network controller may be an Intel Pro 100-A Fast Ethernet controller (including a Media Access Control Circuit (Big MAC) that has a part number 202513-302) made by Intel Corporation of Santa Clara, Calif. An Ethernet controller carries out the above-mentioned conversion and transfer of data, producing Ethernet frames that may be transmitted upstream at frequencies different than the frequency at which the Ethernet controller typically operates. The Ethernet controller also handles frames transmitted thereto downstream at frequencies different than the frequency at which the Ethernet controller operates.

A serial downstream rate at which data packets may be transmitted to an Ethernet controller may be 30 Megabits/second (MB/s), while a serial upstream rate at which data packets may be transmitted to the network may be 128 kilobits/second (KB/s). These rates are subject to change depending on the modulation technology and frequency bandwidth used. Since the downstream transmission rate exceeds 10 MB/s, an ordinary 10 MB/s Ethernet controller may not be adequate for this type of application. While more advanced Ethernet controllers are switch selectable, to operate at either 100 MB/s or 10 MB/s, they do not provide the flexibility for transmitting data upstream or receiving data downstream at frequencies other than 10 MB/s or 100 MB/s. If the downstream or upstream frequencies are different from the frequency at which the Ethernet controller operates, data may be lost in the process of transmission or receipt. Additionally, some Ethernet controllers, including the Big MAC, typically transmit or receive data in parallel, i.e., transmit or receive a nibble of data (four bits) at one time, although data is transmitted to or received from the network in serial form.

It is desirable to provide a circuit that interfaces between a network controller and a network that permits conversion of data from parallel to serial format and vice versa. It is also desirable to provide a circuit that interfaces between a network and a network controller that transfers data to or from the network controller from or to a network, where the frequencies at which data is transmitted to or received from the network differ from the frequency at which the network controller operates.

SUMMARY OF THE INVENTION

The present invention provides in a first embodiment thereof, a circuit to be coupled to a network control and to a network. The circuit includes a first circuit, including a storage device, to receive data from the network at a first frequency. The circuit also includes a second circuit, coupled to the first circuit, that includes a synchronizing circuit, to generate to the network controller a first signal synchronous with a second frequency after the first circuit receives a predetermined number of bits of the data. In response to the first signal, the network controller is configured to latch form the storage device, at the second frequency, the predetermined number of the bits of the data.

In a second embodiment thereof, the present invention provides a circuit configured to be coupled to a network controller and a network. The circuit includes a first circuit to transmit data to the network at a first frequency. The circuit also includes a second circuit coupled to the first circuit. The second circuit includes a synchronizing circuit to generate a first signal, synchronous with the second frequency, to the network controller after the first circuit transmits to the network a predetermined number of bits of the data. Responsive to the first signal, the network controller is configured to generate to the first circuit, at a second frequency, a number of bits equal to the predetermined number of bits of the data.

BRIEF DESCRIPTION OF THE DRAWINGS

The features, aspects, and advantages of the present invention will become more fully apparent from the following detailed description, appended claims, and the accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid unnecessarily obscuring the present invention.

Figure 1:
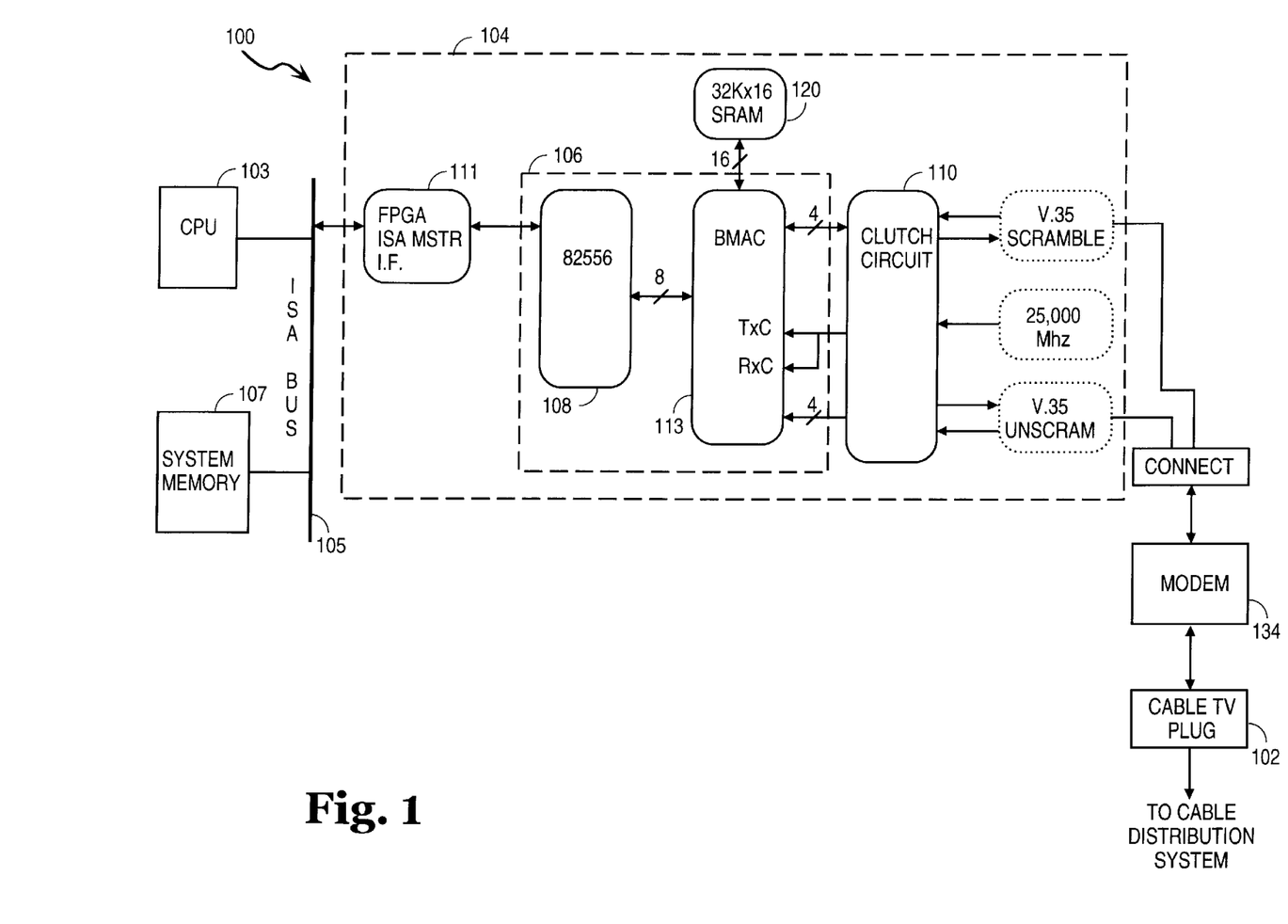
FIG. 1 illustrates a block diagram of a computer system according to the present invention.

FIG. 1 illustrates a block diagram of a computer system 100 according to the present invention. Computer system 100 includes a Central Processing Unit (CPU) 103, referred to as a "host CPU." The host CPU 103 is coupled to a system bus 105, which may be an ISA bus, by way of non-limiting example. A system memory device 107 is also coupled to bus 105. Furthermore, computer system 100 includes an adapter circuit 104 (hereinafter "ISA adapter"), shown in dotted line, and a modem circuit 134 coupled to ISA adapter 104. ISA adapter 104 receives and transmits data from or to a network via modem 134. In one embodiment according to the present invention, the modem circuit 134 may be coupled to a cable distribution system (hereinafter "network") (not shown) via a cable TV plug 102, thereby connecting computer system 100 to the cable distribution system. However, the present invention is not limited to use in conjunction to a cable distribution system but may be used in connection to a modem coupled to a telephone line. In the embodiment of the computer system described herein, the cable distribution system is used to provide a broadband media for signals that are transmitted within a wide range of frequencies. Modem circuit 134 performs functions such as modulation, demodulation, cable interface, etc., in connection with signals exchanged between the computer system 100 and the cable distribution system (not shown).

The ISA adapter circuit 104 further includes a network controller circuit 106 that may be an Ethernet controller, but the present invention is not limited in this respect. The Ethernet controller includes circuitry that typically converts a serial signal into a parallel signal and vice versa, performs error detection, and checks an incoming address of a data packet, to determine whether the data packet received by ISA adapter circuit 104 was addressed to system 100. Network Controller circuit 106 may include a control engine circuit 113 capable of transmitting data packets between the network and the computer system 100. The control engine may be a Collision Sensing Multiple Access/Collision Detection (CSMA/CD) engine which is known by persons skilled in the art. In the embodiment described herein, circuit 113 is an Intel Big MAC circuit incorporated in an Ethernet Controller such as the Intel Pro 100-A-Fast Ethernet controller, available from Intel Corporation of Santa Clara, Calif., but the present invention is not limited in scope to a Big MAC circuit. The Big MAC is configured to receive and transmit Ethernet data packets at a rate of approximately 100 MB/s. Big MAC 113 can operate in full duplex, i.e., it can transmit and receive simultaneously. A memory device 120, that may be an SRAM memory, is coupled to Big MAC 113, and provides temporary storage for inbound and outbound data to insure against underrun and overrun situations.

Circuit 113 (BMAC) converts the data part of a serial data packet into nibbles of data and drives this data in parallel to a system interface circuit 108, which further drives data into the system memory 109 via an Field Programmable Gate Array (FPGA) circuit 111. The system interface circuit 108 may be a 82556 circuit, manufactured by Intel Corporation of Santa Clara, Calif. Circuit 108 typically includes a plurality of state machines and DMA controllers that move data into and out of the system memory 107. Circuit 108 performs DMA transactions and communicates with the host CPU via a shared system memory command block (not shown). This relieves the host CPU from the task of copying data back and forth to the ISA adapter circuit. The FPGA circuit 111 may be programmed and used to provide compatibility between the 82556 system interface and an interface of ISA bus 105. FPGA circuits are well-known in the art. Circuit 108 includes an 8-bit, bi-directional data path used to transfer bytes between the system bus 105 and the BMAC at a rate of approximately 33 MB/s, but the present invention is not limited to such a rate. Circuit 108, in conjunction with the FPGA circuit 111 thus acts as a bus master on the ISA bus for any Tx and Rx data to be transferred between the Ethernet controller 106 and the system memory 107.

As the bandwidth on the ISA bus may not be constant, the BMAC 113 includes a plurality of FIFO interfaces (not shown) that allow changing the transmission rate of the data packets to a transmission rate compatible to the bandwidth of the ISA bus. The FIFO interfaces are coupled to a plurality of FIFO devices 107.

The ISA adapter 104 further includes a circuit 110 that is configured to receive a serial input stream of data from the network at a first frequency. Circuit 110 converts this data into parallel format, and drives it to the network controller at a second frequency. Also, circuit 110 is configured to receive, from the network controller, data in parallel format at a second frequency. The parallel data is converted by circuit 110 into a serial stream and transmitted at a first frequency upstream to the network. Before being driven to circuit 110, the input stream and an End of Packet (EOP) signal are passed through several circuits that perform functions such as de-interleaving, error correction (Reed-Solomon), unscrambling, EOP detection, etc.

Figure 2:
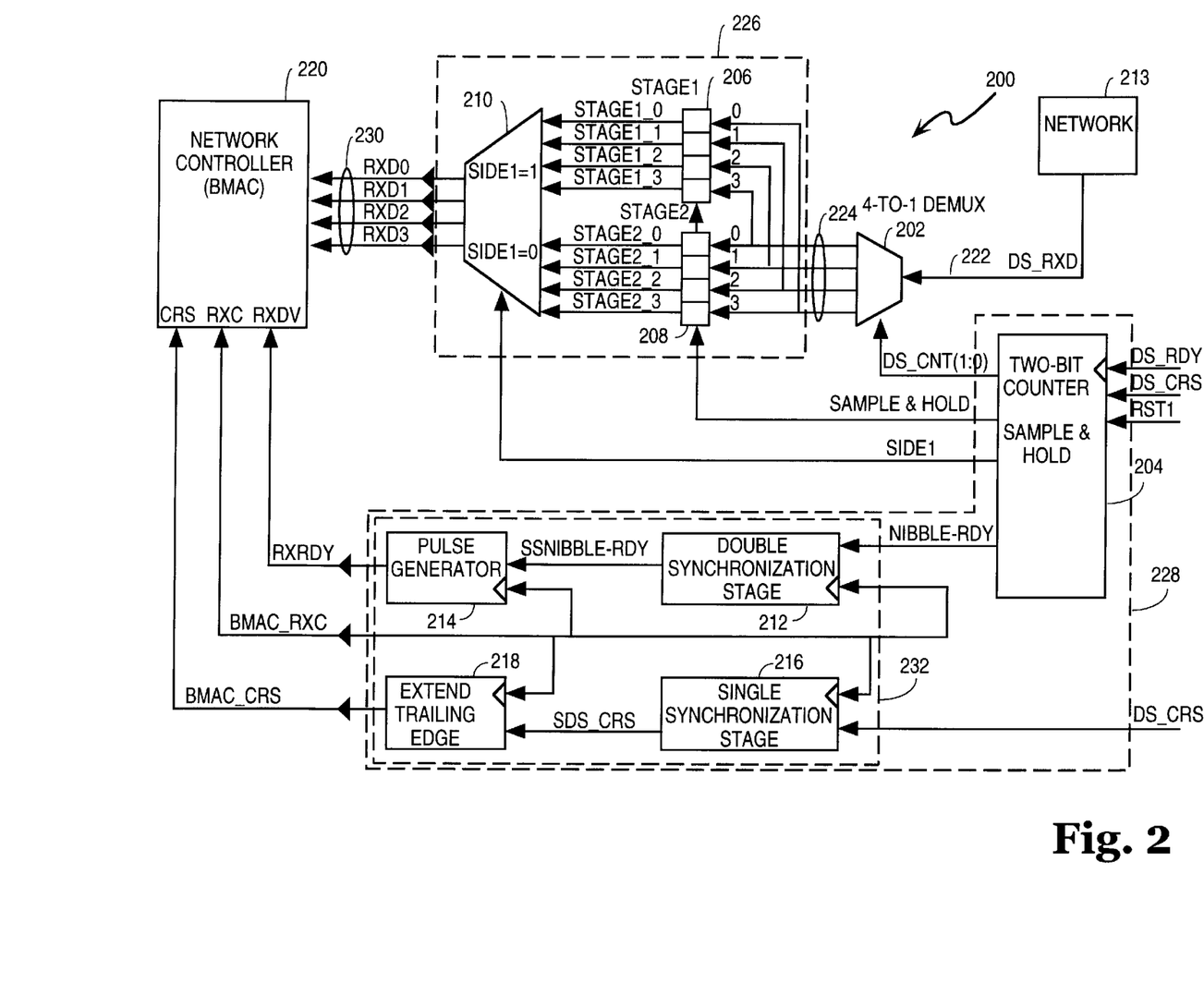
FIG. 2 illustrates an embodiment of a circuit for use in connection with downstream packets of data according to the present invention.

FIG. 2 illustrates one embodiment of a circuit 200 used in connection with downstream serial data packets. These data packets are typically transmitted from remote terminals, such as Local Area Networks (LAN) at a first frequency. A modem circuit (not shown) performs several processes upon this data, as explained above, and then sends the data to an ISA adapter circuit, such as circuit 104 of FIG. 1. The ISA adapter includes circuitry that subject data to processes such as clock/data recovery, de-interleaving, Reed-Solomon error correction, unscrambling, end of packet detection, etc. These processes are well-known to persons having ordinary skill in the art. After undergoing these processes, the serial data is driven via line 222 to circuit 200 according to the present invention.

Circuit 200 includes a demultiplexing circuit 202 configured to receive at an input thereof the serial data and to receive at a control input thereof a two-bit control signal DS_CNT. Depending on the logic value assumed by control signal DS_CNT, circuit 202 selectively drives to one of the four outputs thereof the bit of the serial data received at its input. The four outputs of circuit 202 are coupled by four lines 224 to an input of a first circuit 226. Circuit 226 serially receives sequential bits of data via one of lines 224 and converts this data by way of one of first and second registers 206 and 208, and by way of a selective device 210 controlled by a select signal driven by a second circuit 228.

Second circuit 228 includes a control circuit 204 that receives at an input thereof a first clock signal DS_CRS. The first clock signal DS_CRS has a frequency substantially identical with the first frequency of the serial data transmitted downstream to circuit 200. In the embodiment described herein, the frequency of this clock signal is 30 Megahertz (MHz). Control circuit 204 additionally receives at an input thereof, a signal DS_RDY that is typically asserted when the serial data of the downstream packet is valid. Signal DS_RDY is typically deasserted at the end of a packet (EOP) of data. When signal DS_RDY is asserted, control circuit 204 includes a two-bit counter state machine that counts up modulo 4 the number of sequential bits received by first circuit 226. Every time signal DS_CRS transitions from 0 to 1 (rising edge), the two bit counter state machine counts up, updates the data count signal (DS_CNT) and drives this signal to the control input of demultiplexing circuit 202. In response to the DS_CNT signal, circuit 202 drives, to one of the four output lines 224, a current bit received at its input (the bit last counted by two-bit counter state machine). In this way serial data is driven sequentially to the storage cells (flip-flops) of either register 206 or register 208, depending on a logic value assumed by a SAMPLE & HOLD signal.

A selecting device 210 (multiplexer in the embodiment described herein) selectively gates a content of one of registers 206 and 208, coupled to inputs of this multiplexer, to an output thereof depending on the logic state assumed by a signal SIDE coupled to a control gate of multiplexer 210. Every time the two-bit counter state machine has counted 4 bits, signal SIDE is toggled to a logic complement of the logic value previously assumed by the SIDE signal (before the state machine has counted 4 bits).

A SAMPLE & HOLD signal generated by a SAMPLE & HOLD circuit (included in control circuit 204) is driven to the flip-flops of registers 206 and 208. When the SAMPLE & HOLD signal is asserted to one of the 1-bit cells of registers 206 and 208, that respective cell is sampled thereby latching therein, one bit of data driven thereto by circuit 202. The data latched by that respective cell is then held therein until all the other bits making up a nibble (4 bits) have been latched by all four cells of the respective enabled register.

A nibble of data is assembled by first circuit 226 and presented via four lines 230 to a network controller 220 that is configured to operate at a second frequency that is approximately 100 Mb/s. Network controller 220 may be an Ethernet controller that includes a BMAC circuit and a system interface circuit such as an 82556 circuit. Once the first circuit receives a predetermined number of bits, transmitted downstream from network 213 via line 222, the second circuit 228 is configured to generate to the network controller 220 a signal RX_RDY that is synchronized to the frequency of the network controller (second frequency). In response to the signal RX_RDY (first signal), the network controller 220 is configured to latch at the second frequency (it's own frequency) the nibble stored in one of registers 206 or 208.

Once the two-bit counter state machine has counted four consecutive bits, control circuit 204 asserts a NIBBLE-RDY signal to a synchronizing circuit 232 included in second circuit 228. Synchronizing circuit 232 includes a double synchronization stage 212 that receives, at a clock input thereof, a clock signal that has substantially the same frequency as the one frequency (second frequency) at which network controller 220 operates. The double synchronization stage may include two D flip-flops coupled serially, i.e. a Q output of a first flip-flop being driven to a D output of a second flip-flop. This configuration is well-known in the art. Double synchronization stage 212 performs upon signal NIBBLE_RDY a double synchronization operation which is well known by persons skilled in the art. Once the double synchronization is performed, a signal SSNIBBLE-RDY is asserted to a pulse generator 214 that generates the first signal RX_RDY to the network controller 220 on the next clock cycle (second frequency) after which signal SSNIBBLE_RDY was received. Signal RX_RDY is thus synchronous to the frequency (second frequency) of the network controller 220.

Synchronization circuit 232 further includes a single synchronization stage 216 that receives at the first frequency, signal DS_CRS which indicates the end of a packet (EOP). The single synchronization stage 216 synchronizes the DS_CRS signal to the second frequency of the network controller and asserts a signal SDS_CRS, synchronized to the second frequency of the network controller 220, to Extend Trailing Edge Circuit 218. Extend Trailing Edge circuit extends a trailing edge of a signal BMAC_CRS generated by this circuit. Signal BMAC_CRS indicates to network controller 220 an end of packet (EOP).

Figure 3:
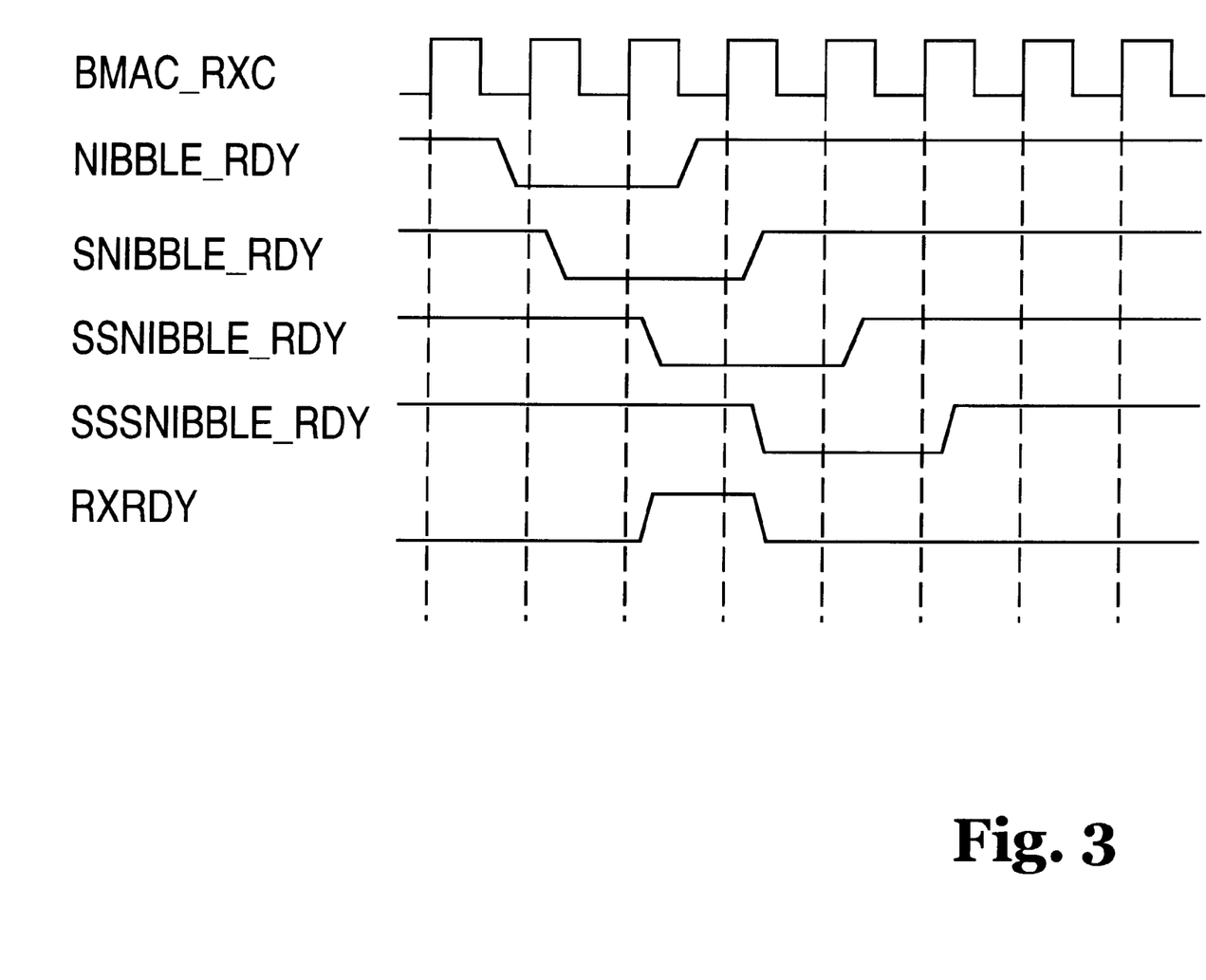
FIG. 3 diagrammatically illustrates various waveforms in connection with the circuit according to the present invention.

FIG. 3 diagrammatically illustrates various waveforms in connection with the circuit 200 according to the present invention. Signal BMAC_RXC represents a clock signal, at a second frequency, that sequences the operation of network controller 220 of FIG. 2. Signal SNIBBLE_RDY is an internal signal of double synchronization stage and is asserted next clock cycle (BMAC_RXC) after the two-bit counter state machine has asserted the signal NIBBLE_RDY. During another clock cycle (BMAC_RXC), the double-synchronization stage 212 performs the second synchronization thereby generating a SSNIBBLE_RDY signal to pulse generator 214 of FIG. 2. Pulse generator 214 asserts signal RX_RDY upon a next rising edge transition of BMAC_RXC, causing network controller 220 to latch data presented at its input. Note that the delay introduced by the double-synchronization stage and the pulse generator needs to be substantially equal to 4 clock cycles (in terms of first frequency clock cycles). This is so, as the RX_RDY signal needs to be asserted at a substantially same time at which one of registers 206 and 208 assembles four bits. In this way, the four bits assembled in one register may be latched by network controller by the time the other register has assembled a new nibble thereby freeing up the register from which data was last latched by the network controller to receive serial data thus avoiding loss of data from the network.

Figure 4:
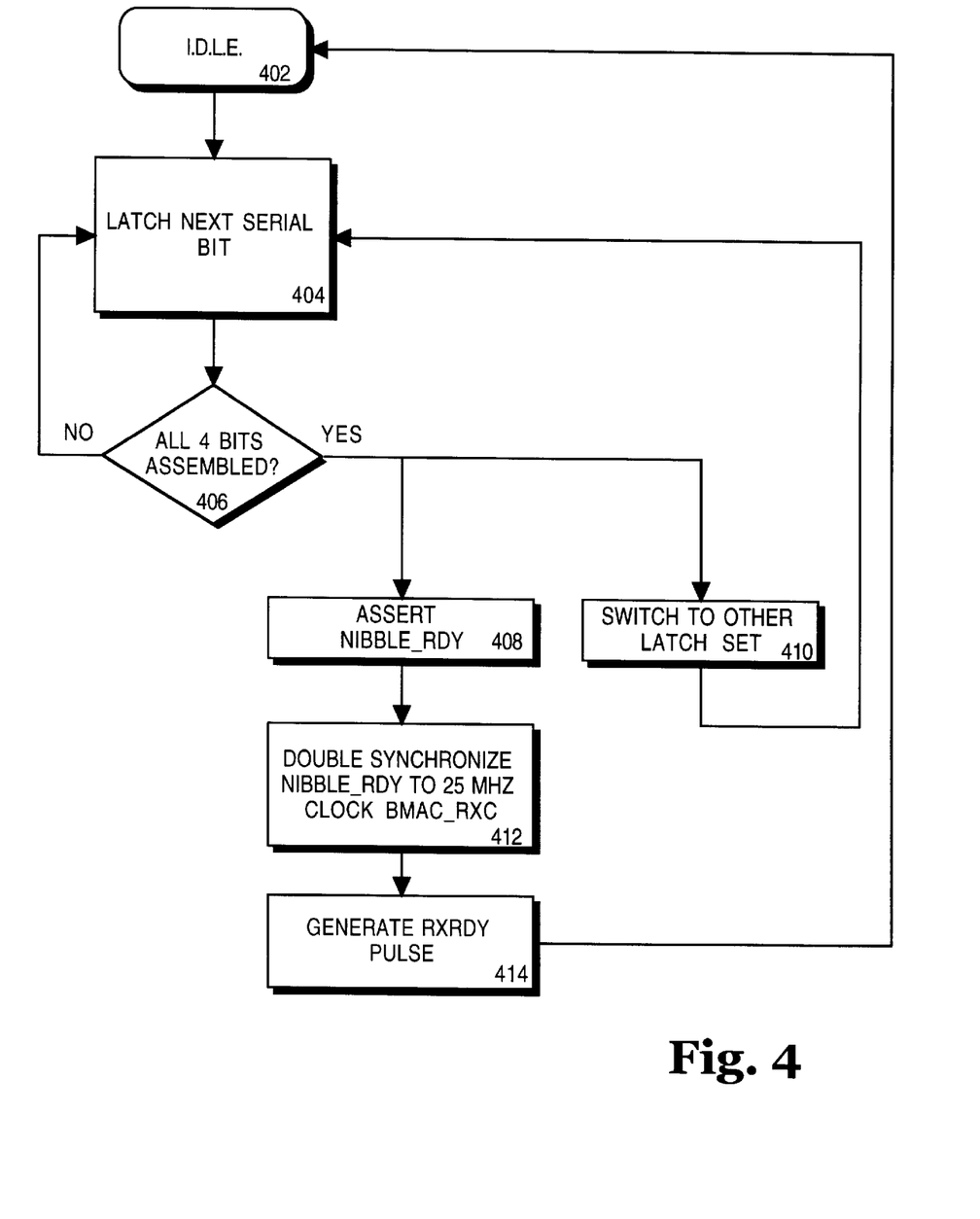
FIG. 4 illustrates a flowchart diagram for an embodiment of a process for interfacing a network to a network controller according to the present invention.

FIG. 4 illustrates a flowchart diagram for an embodiment of a process for interfacing a network to a network controller according to the present invention. The process starts at idle step 402 from where it passes to step 404, where a next serial bit of a data packet is latched by a circuit such as the one described in connection with FIGS. 2 and 3. The process then flows to decision block 406 where it is determined whether four consecutive bits of data have been assembled by the circuit. If four bits of data have not been assembled, the process flows to state 404 where a next serial bit is latched. However, if four bits have been assembled by the circuit, the process passes to step 408 where a control circuit, such as control circuit 204 of FIG. 2, asserts a signal NIBBLE_RDY to a synchronizing circuit such as circuit 232 of FIG. 3. The NIBBLE_RDY signal indicates that 4 bits have been assembled. At step 410, the control circuit enables a register different than the current register that has just assembled 4 bits. The enabled register starts latching therein new incoming serial bits of data. The process then passes to step 412 where a synchronizing circuit, such as circuit 232 of FIG. 2, double-synchronizes the NIBBLE_RDY signal with a frequency (second frequency) of the network controller. The process then passes to step 414 where the synchronizing circuit 232 generates synchronized signal RX_RDY to the network controller. In response to this signal, the network controller latches, in parallel, at the second frequency, the above-mentioned four assembled bits. The process then flows back to step 402.

Figure 5:
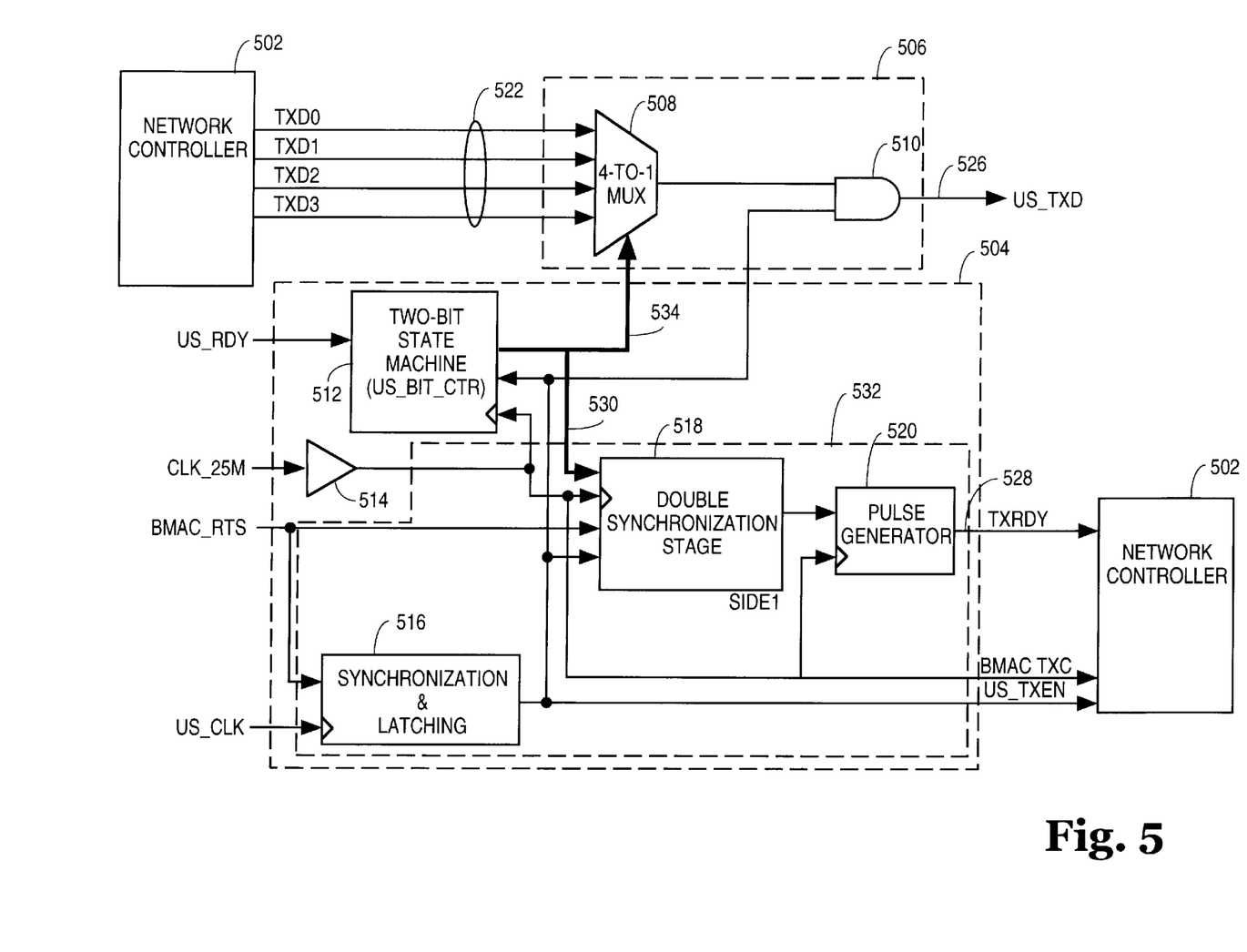
FIG. 5 illustrates an embodiment of a circuit for use in connection with upstream packets of data according to the present invention.

FIG. 5 illustrates a second embodiment of a circuit 500 according to the present invention. Circuit 500 may be utilized for interfacing between a network and a network controller that transmits data from a host system memory, for example, upstream to a network. The second circuit 500 includes a first circuit 506 that is configured to receive a predetermined number of bits (a nibble of data in the embodiment described herein) from a network controller 502 via 4-bit line 522. A nibble may be driven through lines 522 to a selecting device 508, that is a multiplexer in the embodiment described herein. Multiplexer 508, in conjunction with a second circuit 504, transmits serially to a network data received from the network controller. Typically, the network controller operates at a frequency (second frequency) that is greater than a first frequency at which data is transmitted to a network. In the embodiment described herein, the second frequency is approximately 25 MHz per 4 parallel bits while the first frequency is approximately 128 KHz.

Second circuit 504 includes a control circuit 512 with a two-bit counter state machine. The two-bit counter state machine includes a modulo 4 countdown counter that counts down every time one bit is transmitted by first circuit 506. Every time the two-bit counter counts down one bit, control circuit 512 drives, via a line 534, a select signal to multiplexer 508. The select signal indicates to multiplexer 508 which of the four bits, received at an input thereof, is to be gated to the output thereof. Multiplexer 508 selectively gates at an output thereof, in response to the select signal, one of the bits of the nibble driven to its input by the network controller. Data at the output of multiplexer 508 is then serially transmitted to the network at a first frequency that is typically lower than the second frequency at which network controller 502 operates.

Since the operation of the two-bit counter state machine is sequenced by a clock signal (US_CLK) at a frequency substantially equal to the first frequency, the select signal, asserted to multiplexer 508, has the first frequency. In response to the control signal, multiplexer 508 causes data at its input to be gated at its output and thus to be transmitted to the network at a first frequency. The net result is that first circuit 506 serially drives bits of data to the network at the first frequency.

The first circuit 506 also includes an AND gate 510 that prevents data from being sent out to the network once the signal BMAC_RTS is deasserted. When the last bit of the data packet has been transmitted upstream by circuit 506, the BMAC_RTS is deasserted, indicating the end of packet, thereby preventing gate 510 from transmitting data other than 0 to the network.

Before transmitting to first circuit 506 a first nibble of a data packet, network controller 502 asserts signal BMAC_RTS to the second circuit 504. When first circuit 506 finishes transmitting to the network a predetermined number of bits (4 bits in the embodiment discussed herein), the second circuit generates a first signal (TX_RDY) to network controller 502 via line 528. Once the network controller 502 drives a new nibble to first circuit 506, second circuit 504 deasserts first signal TX_RDY to prevent the network controller 502 from further driving out a next nibble before all the bits of the present nibble transmitted to first circuit 506, are serialized and shifted out to the network.

The two-bit counter state machine asserts a second signal via line 530 to a synchronization circuit 532 every time four successive bits have been transmitted. In response to the second signal, the synchronization circuit generates first signal TX_RDY synchronized with the second frequency. When signal TX_RDY is asserted, the network controller drives the next nibble of data to the first circuit 506.

The second circuit 504 includes synchronizing circuit 532 that causes the TX_RDY signal generated to the network controller to be synchronized with the second frequency of the network controller 502. Second circuit 532 includes a double-synchronization stage 518 that receives a second signal from the two-bit counter state machine via lines 530 and double synchronizes that signal to the second frequency. A pulse generator 520 receives a double-synchronized signal from double synchronization stage 518 and generates the TX_RDY signal. The second circuit 504 also includes synchronization circuit 516, that receives the BMAC_RTS signal and a clock signal at a first frequency and synchronizes the BMAC_RTS signal with the first frequency, thereby generating packet framing signal US_TXEN indicating to the network that data packet transmission is in course or that a data packet has been transmitted.

Figure 6:
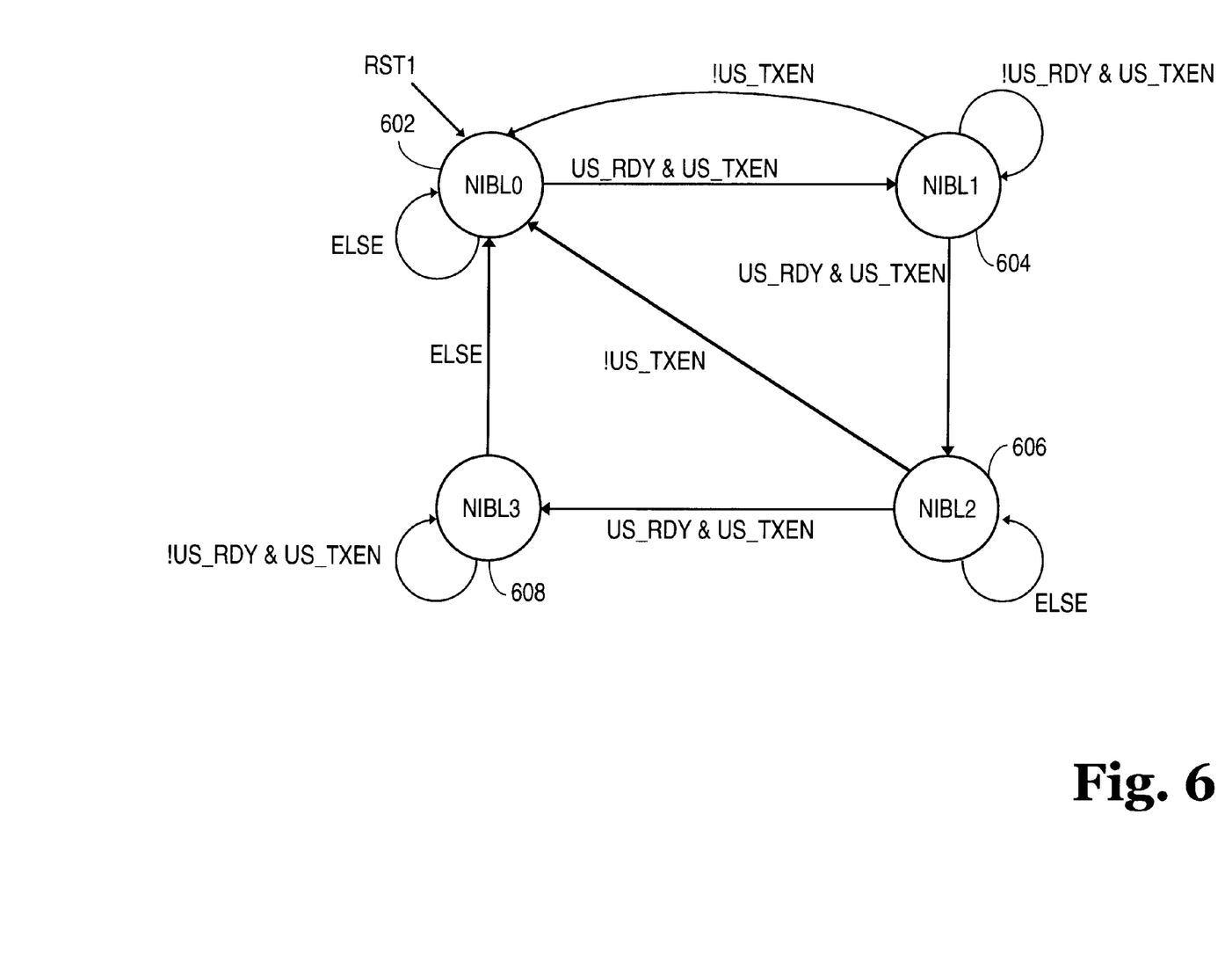
FIG. 6 illustrates a flowchart diagram of a two-bit counter state machine.

FIG. 6 illustrates a flowchart diagram of the two-bit counter state machine of FIG. 5. Beginning at state 602, an entire nibble has been serially transmitted to the network. When the modulo 4 counter is reset by signal RST1, the two-bit counter state machine determines whether signals US_RDY and US_TXEN are asserted. The signal US_RDY indicates that a bit of a nibble of data may be transmitted. The framing signal US_TXEN, when asserted, indicates that there are still bits of data, in a pipeline of the network controller, to be transmitted. If both the US_RDY and US_TXEN signals are asserted, the second circuit transmits the first bit of a nibble. However, if one of these signals is not asserted, the state machine remains in first state 602.

After the first bit of a nibble is transmitted, the state machine passes to a second state 604. At this state, the second bit of the current nibble is transmitted and the state machine passes to state 606 if both signals US_RDY and US_TXEN are asserted. However, if US_TXEN is not asserted, which indicates that there are no more bits of the data packet to be transmitted, the state machine passes to state 602. If there are further bits of the data packet in the pipeline but the signal US_RDY is not asserted, the state machine remains at state 604. At state 606, the third bit of data is transmitted if both signals US_RDY and US_TXEN are asserted. However, if there are further bits of the data packet in the pipeline of the network controller but the US_RDY signal is not asserted, the state machine remains at state 606. Otherwise, if both signals US_RDY and US_TXEN are asserted, the state machine passes to state 608 where the fourth bit is transmitted. At this state, the signal US_RDY is checked and if this signal is not asserted, the state machine remains at state 608. Otherwise, the state machine passes to first state 602.

Figure 7:
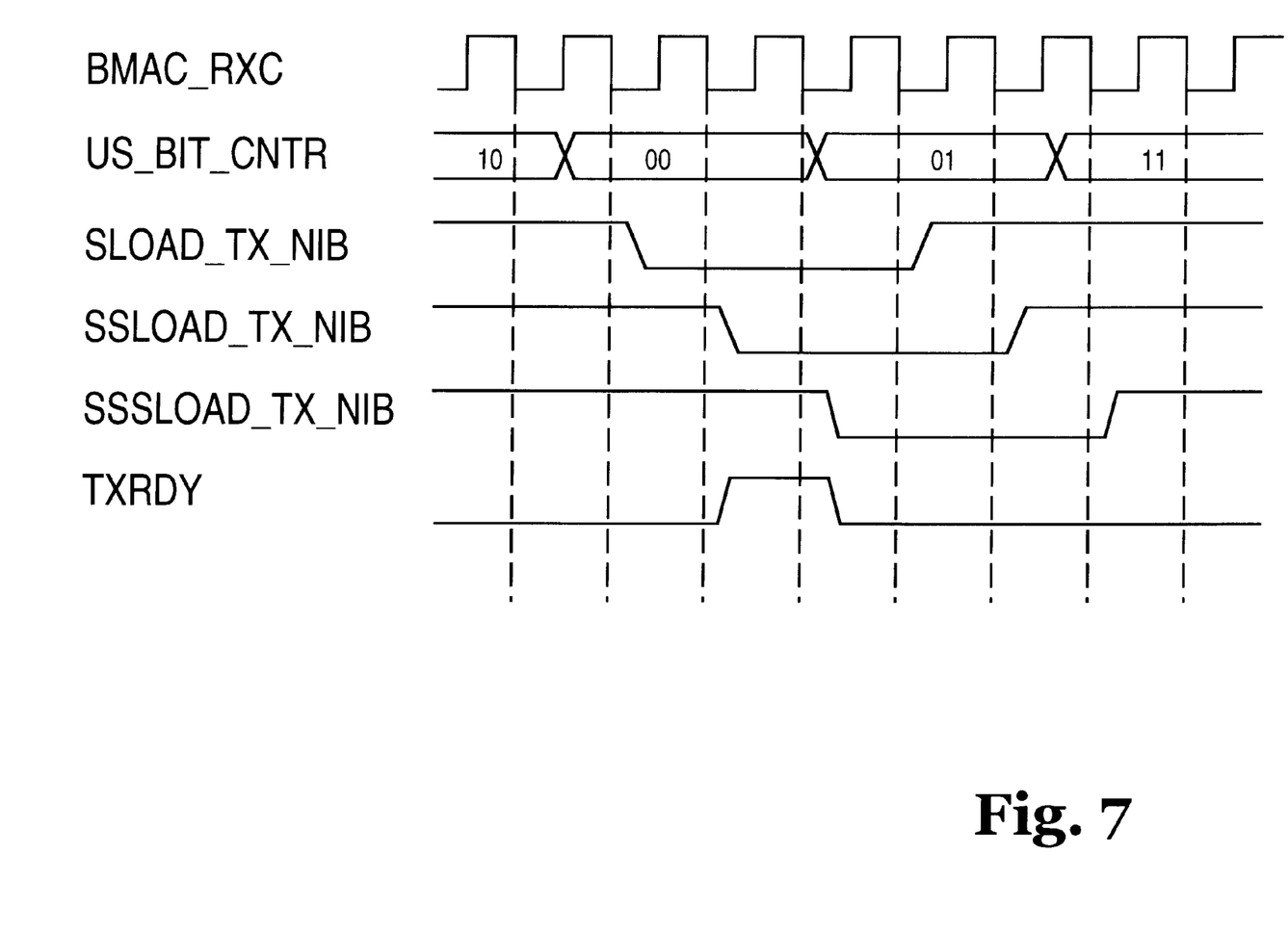
FIG. 7 illustrates several various waveform diagrams in connection with the second circuit according to the present invention.

FIG. 7 diagrammatically illustrates several various waveform diagrams in connection with the second circuit according to the present invention. Signal BMAC_TXEN represents the clock signal that sequences the operation of the network controller at the second frequency. Waveform US_Bit_Cntr represents a control signal that is sent to multiplexer 508 of FIG. 6 by the state machine. This signal indicates which bit of data of the four bits of data of a current nibble is to be transmitted to the network. Note that the frequency of the US_BIT_CNTR (first frequency) is substantially lower than the frequency of BMAC_TXC. Waveforms SLOAD_TX_NIB and SSLOAD_TX_NIB are signals representing internal variables in the second circuit 528 of FIG. 5. Waveform SSSLOAD_TX_NIB represents an internal variable of pulse generator circuit 520. These signals are used by the synchronization circuit 532 to insure that the TX_RDY signal is not asserted too soon to network controller 502. In this way, the synchronizing circuit generating signal TX_RDY prevents the network controller 502 from driving a next nibble of data to the circuit of FIG. 5 before the circuit has transmitted all four bits of a nibble. Signal TX_RDY is the signal asserted to the network controller whenever the two-bit counter state machine passes to the first state.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

I claim:

1. A circuit configured to be coupled to a network controller and to a network, the circuit comprising:
   a first circuit including a storage device to receive data from said network at a first frequency;
   a second circuit, coupled to said first circuit, including a synchronizing circuit to generate, to said network controller, a first signal synchronous with a second frequency, when said first circuit receives a predetermined number of bits of said data; and
   responsive to said first signal, said network controller configured to latch from said storage device at said second frequency, said predetermined number of bits of said data.

2. The circuit of claim 1 wherein said second circuit includes a counter device to count a number of bits received by said first circuit.

3. The circuit of claim 2 wherein said first circuit includes a selecting device having an input coupled to said network, a control gate coupled to said counter device, and an output.

4. A process for interfacing between a network and a network controller, the process comprising the steps of:
   receiving, by a storage device of a first circuit, a number of bits of data from said network at a first frequency;
   determining by a second circuit whether said number of bits of data received is equal to a predetermined number; and
   if said number of bits of data received is equal to said predetermined number, said second circuit causing said network controller to latch, at a second frequency, said predetermined number of bits received from, said storage device.

5. A circuit configured to be coupled to a network controller and to a network, the circuit comprising:
   a first circuit to transmit data to said network at a first frequency;
   a second circuit, coupled to said first circuit, including a synchronizing circuit to generate a first signal, synchronous with a second frequency, to said network controller after said first circuit transmits to said network a predetermined number of bits of said data; and
   responsive to said first signal network controller configured to generate to said first circuit, at said second frequency, a number of bits equal to said predetermined number of bits of said data.

6. The circuit of claim 5 wherein said second circuit includes a counter device configured to count a number of bits transmitted by said first circuit.

7. The circuit of claim 6, wherein said first circuit includes a selecting device having an input coupled to said network controller, a control input coupled to said counter device, and an output coupled to said network.

8. A process for interfacing between a network and a network controller, the process comprising the steps of:
   transmitting, by a first circuit, to said network at a first frequency, a number of bits of data generated by said network controller;
   determining, by a second circuit, whether said number of bits of data transmitted is equal to a predetermined number of bits of data; and
   if said number of bits of data transmitted is equal to said predetermined number of bits of data, said second circuit causing said network controller to generate, to said first circuit, at a second frequency, a predetermined number of bits of data.

9. A computer system comprising:
   a processor;
   a bus coupled to said processor;
   a memory device coupled to said bus;
   a network controller coupled to said bus; and
   a circuit configured to be coupled to a network controller and to a network, the circuit comprising:
      a first circuit including a storage device to receive data from said network at a first frequency;
      a second circuit, coupled to said first circuit, including a synchronizing circuit to generate, to said network controller, a first signal synchronous with a second frequency, after said first circuit receives a predetermined number of bits of said data; and
      responsive to said first signal, said network controller configured to latch from latch from said storage device, at said second frequency, said predetermined number of bits of said data.

10. The system of claim 9 wherein said second circuit includes a counter device to count a number of bits received by said first circuit.

11. The system of claim 10 wherein said first circuit includes a selecting device having an input coupled to said network, a control gate coupled to said counter device, and an output.

12. A computer system comprising:
    a processor;
    a bus coupled to said processor;
    a memory device coupled to said bus;
    a network controller coupled to said bus; and
    a circuit configured to be coupled to a network controller and to a network, the circuit comprising:
       a first circuit to transmit data to said network at a first frequency;
       a second circuit, coupled to said first circuit, including a synchronizing circuit configured to generate a first signal, synchronous with a second frequency, to said network controller after said first circuit transmits to said network a predetermined number of bits of said data; and
       responsive to said first signal said network controller configured to generate to said first circuit, at said second frequency, a number of bits equal to said predetermined number of bits of said data.

13. The system of claim 12 wherein said second circuit includes a counter device to count a number of bits transmitted by said first circuit.

14. The system of claim 13, wherein said first circuit includes a selecting device having an input coupled to said network controller, a control input coupled to said counter device, and an output coupled to said network.

15. A circuit configured to be coupled to a network controller and to a network, the circuit comprising:
    a first circuit including a storage device to receive data from said network at a first frequency;
    a second circuit, coupled to said first circuit, to generate to said network controller a first signal synchronous with a second frequency, after said first circuit receives a current set of predetermined number of bits of said data; and
    responsive to said first signal, said network controller configured to latch, from of said device, at said second frequency, said current set of predetermined number of bits of data no later than a next set of predetermined number of bits of said data received by said first circuit from said network.

16. A circuit configured to be coupled to a network controller and to a network, the circuit comprising:

a first circuit to transmit data to said network at a first frequency; and a second circuit, coupled to said first circuit, including a synchronizing circuit to generate a first signal, synchronous with a second frequency, to said network controller after said first circuit transmits to said network a predetermined number of bits of said data; and responsive to said first signal said network controller configured to generate to said first circuit, at said second frequency, a number of bits equal to said predetermined number of bits of data and, after generation of said number of bits of data equal to said predetermined number, said second circuit configured to deassert said first signal.

* * * * *